United States Patent
Yokomori

[11] 3,897,665
[45] Aug. 5, 1975

[54] STEEL STAIR ASSEMBLY

[76] Inventor: Seibun Yokomori, 29-2 Hatagaya 1-chome, Shibuya-ku, Tokyo, Japan

[22] Filed: Sept. 3, 1974

[21] Appl. No.: 503,046

[52] U.S. Cl. .................................................. 52/188
[51] Int. Cl. ......................... E04f 11/00; E04f 19/10
[58] Field of Search ............ 52/182, 184, 185, 188, 52/191

[56] References Cited
FOREIGN PATENTS OR APPLICATIONS
1,370,733  7/1964  France ............................... 52/188

Primary Examiner—John E. Murtagh
Attorney, Agent, or Firm—Kurt Kelman

[57] ABSTRACT

There is provided a steel stair assembly which is fabricated by other than welding to overcome such deficiencies which occur frequently to steel stairs fabricated by welding, e.g., distortion and twist due to welding heat as well as the various resulting drawbacks. The steel stair assembly comprises a pair of opposed plate stringers, and a plurality of L-shaped individual stair units arranged between the pair of the plate stringers and each comprised of a tread and a riser in a continuous form. Each of the L-shaped individual stair units is composed of two sheet steels bonded together, and the individual stair units are interconnected to provide a continuous flight of stairs. Each of the individual stair units is securely connected to the stringers by at least one steel rod disposed between the bonded sheet steels.

5 Claims, 6 Drawing Figures

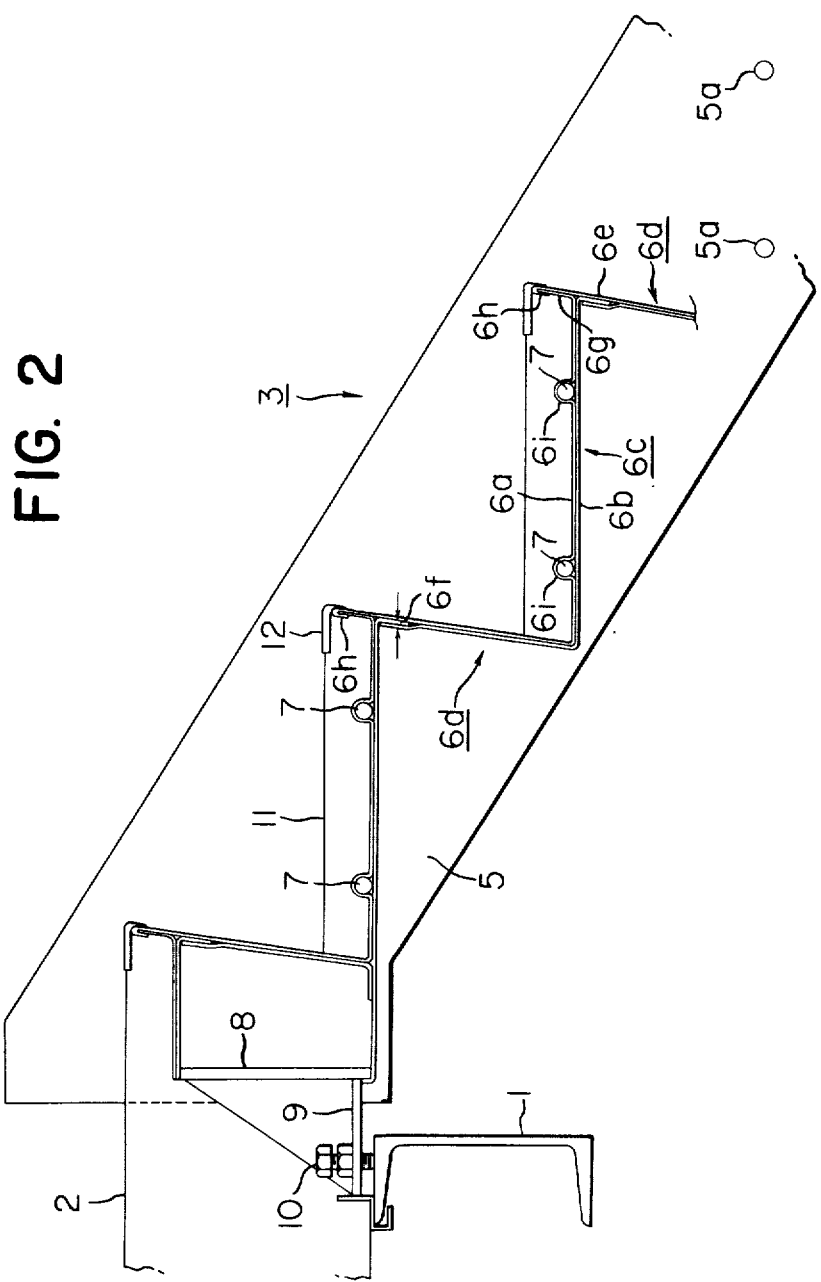

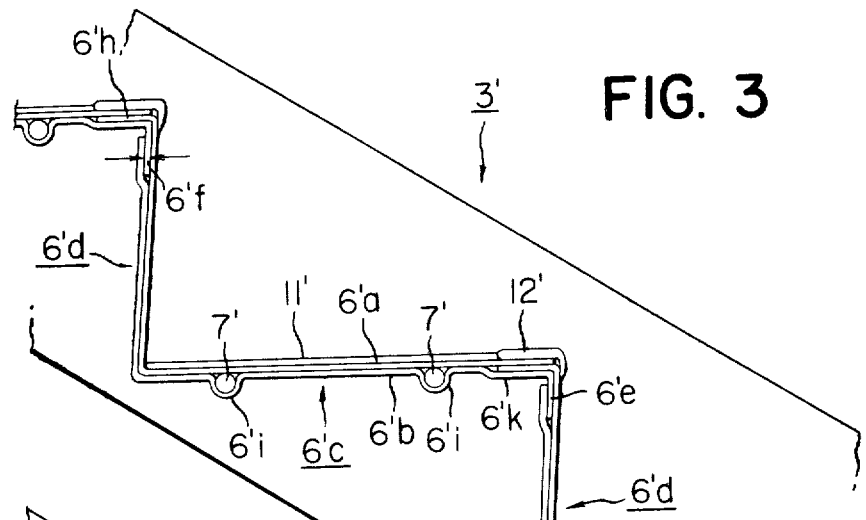
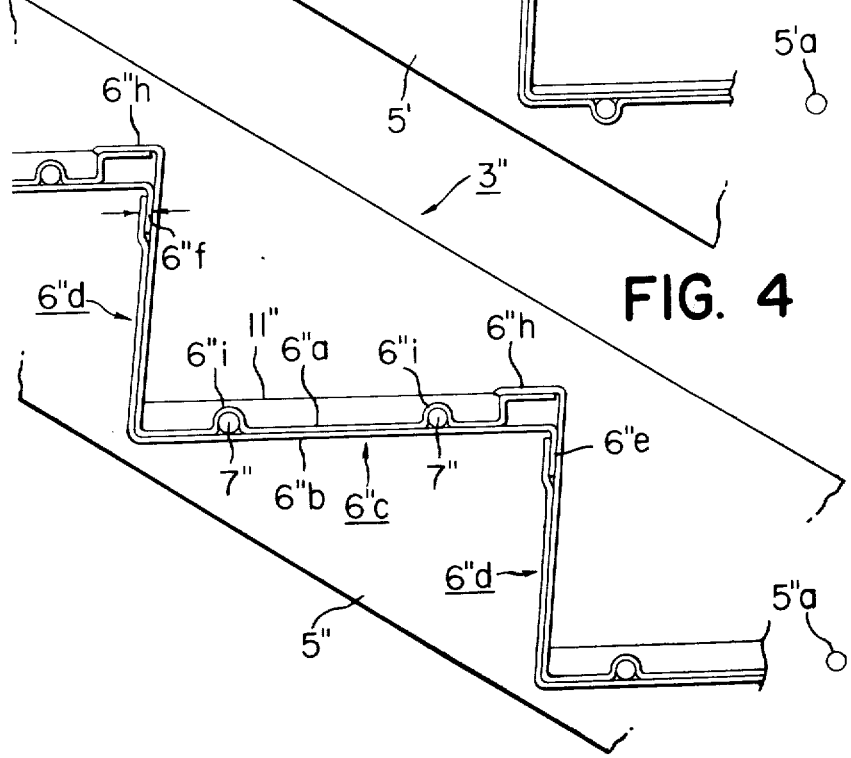

STEEL STAIR ASSEMBLY

BACKGROUND OF THE INVENTION

The present invention relates to a stair assembly which is made of steel plates and which is well suited for use as a temporaly stair installed in a building under construction, an emergency exit stair for a building or an interior stair for a building.

A conventional steel stair of the above type is constructed so that each of the respective treads and risers arranged between a pair of stringers is welded to the stringers along the full or limited length of the ends thereof. This full-or limited-end-face welding is necessary to ensure a satisfactory bonding strength of the stair assembly. However, where the stringers used are in plate form, the partial heating of the stringers during the welding of each tread or riser leads to distortion, and thus successive welding of the treads and risers to the distorted stringers results in the torsional deformation of the finally fabricated stair assembly as a whole, surge in the stringers of the assembly or it causes at least internal strains in the assembly, thus deteriorating the dimensional accuracy of the fabricated stair assembly and reducing the resistance of the assembly to the external load applied thereto. For this reason, the stringers in such an assembly are usually reinforced with channel bars, for example.

The above-described conventional welded, reinforced steel stair assembly is weighty, high in cost and devoid of the advantages of a steel stair assembly of flexible structure, and moreover its manufacture requires much labor and high degree of welding techniques.

In addition to the steel stair assemblies of the welded construction, though rare, steel stair assemblies of a type fabricated by means of bolts and nuts have been proposed. In the stair of this type, the treads and risers are secured to the stringers by means of a large number of L-shaped members and a large number of bolts so that a large number of component parts is required with resultant increase in the manufacturing cost.

Further, concrete stairs have also been used widely as interior stairs for buildings. With such a concrete stair, it is not infrequent that variation of the forms necessitates additional labor such as the chipping operation of the solidified concrete. Due to the fact that a skilled workman who is capable of skillfully preparing the forms is not easily obtainable recently, the concrete stair may be advantageously be replaced with a steel stair from a cost point of view.

SUMMARY OF THE INVENTION

Therefore the present invention comprises a steel stair assembly which is fabricated in such a manner that instead of securely fastening the respective threads and risers to a pair of stringers by welding their end faces to the stringers, a plurality of L-shaped individual stair units each thereof composed of two sheet steels bonded together and comprising a tread portion and a riser portion in continuous form are usually fastened securely to a pair of plate stringers by means of nuts and at least one steel rod provided between the bonded sheet steels in the tread portion of each stair unit. The thus assembled construction of the stair assembly provides an improved structure in which the opposed plate stringers that are spread out by the L-shaped individual stair units, are pulled toward each other and connected together by the steel rods that are highly resistant to tension load. Consequently, the load acting on the treads is borne by the steel rods, and therefore each of the individual stair units may be comprised of considerably thin sheet steels as compared with the treads and risers in the conventional all-welded steel stairs. Further, since the stringers are not subjected to any deformation due to welding, an exceedingly high degree of dimensional accuracy is ensured and there is no deterioration of strength. This entirely eliminates the use of reinforcing members such as channel bars. These factors tend to considerably reduce the weight of the stair assembly of this invention and its weight is thus reduced to four-fifths to two thirds of that of the conventional steel stairs of a comparative size.

Further, by virtue of the fact that the tread and riser are provided by each stair unit composed of two sheet steels bonded together and that at least one steel rod is provided between the two sheets to extend therethrough thus forming a channel at the postion where the steel rod is provided, the present invention permits reduction in the thickness of the treads. Furthermore, such an abnormally large reverberatory sound that may be produced when a person ascends or descends the conventional steel stair, may be reduced by suitably selecting the thickness of each of the two sheet steels. Still further, since the load acting on the stairs is borne by the thin treads and the steel rods under tension, the struggling feeling that is felt by a person ascending or descending the stairs is gentler and less fatiguing, and moreover there is no feeling of unpleasantness as compared with the welded stairs and concrete stairs.

Further, since, in the stair assembly according to the present invention, the thickness of the individual stair units is reduced as compared with that required in the conventional stairs and since each stair unit is made of a sheet steel composed of two thin sheets bonded together, it is possible to perform the bending work, etc., with improved accuracy, thus ensuring improved dimensional accuracy and simplified working.

Still further, since each of the L-shaped individual stair units in the stair assembly of this invention is composed of two thin sheet steels bonded together, the structure of the combined individual stair units enables to provide the external appearance which is not deteriorated.

It is therefore an object of the present invention to provide a steel stair assembly which is light in weight and which ensures a high degree of strength without requiring welding operation.

It is another object of the present invention to provide a steel stair assembly which is composed of individual members of relatively simple structure and well suited for mass production.

It is still another object of the present invention to provide a steel stair assembly of the type which needs not be fabricated in a factory and which can be fabricated on site.

It is still another object of the present invention to provide a steel stair assembly which ensures reduced reverberation, good resilience and excellent walking feeling and which is flexible along with a flexible structure of the type employed in high-rise buildings, etc.

BRIEF DESCRIPTION OF THE DRAWING

FIG. 2 is a central longitudinal side sectional view of FIG. 1.

FIG. 3 is a view similar to FIG. 2 showing another embodiment of the stair assembly according to the invention.

FIG. 4 is a view similar to FIG. 2 showing still another embodiment of the invention.

DESCRIPTION OF THE PREFERRED EMBODIMENTS

As mentioned earlier, the present invention basically relates to a steel stair assembly comprising a pair of plate stringers arranged opposite to each other, and a plurality of interconnected L-shaped individual stair units arranged between the pair of stringers and each thereof composed of at least two steel sheets bonded together and consisting of a riser portion and a tread portion in continuous form. Each of the L-shaped individual stair units includes at least one steel rod which is close fit in each of one or plurality of channels formed in practically the central portion of the tread portion on the upper or lower sheet or on both of the two sheets bonded together, and the individual stair unit is securely fastened to the stringers by means of the steel rod. The L-shaped individual stair unit is also provided with a downward bent portion formed at least by the lower sheet of the bonded sheets at the end of the leg portion, a receiving portion formed at the head of the L-shaped to receive the downward bent portion of the upper individual stair unit, and an upward bent portion placed on the end of at least one of the two sheet steels composing the upper individual stair unit. The downward bent portion, receiving portion and upward bent portion provided on each individual stair unit positively interconnect the individual stair units, provides an improved structural strength. However, these portions have different shapes in the specific embodiments that will be described hereinafter.

The preferred embodiments of the present invention will now be described with reference to the accompanying drawings.

Figure 1:
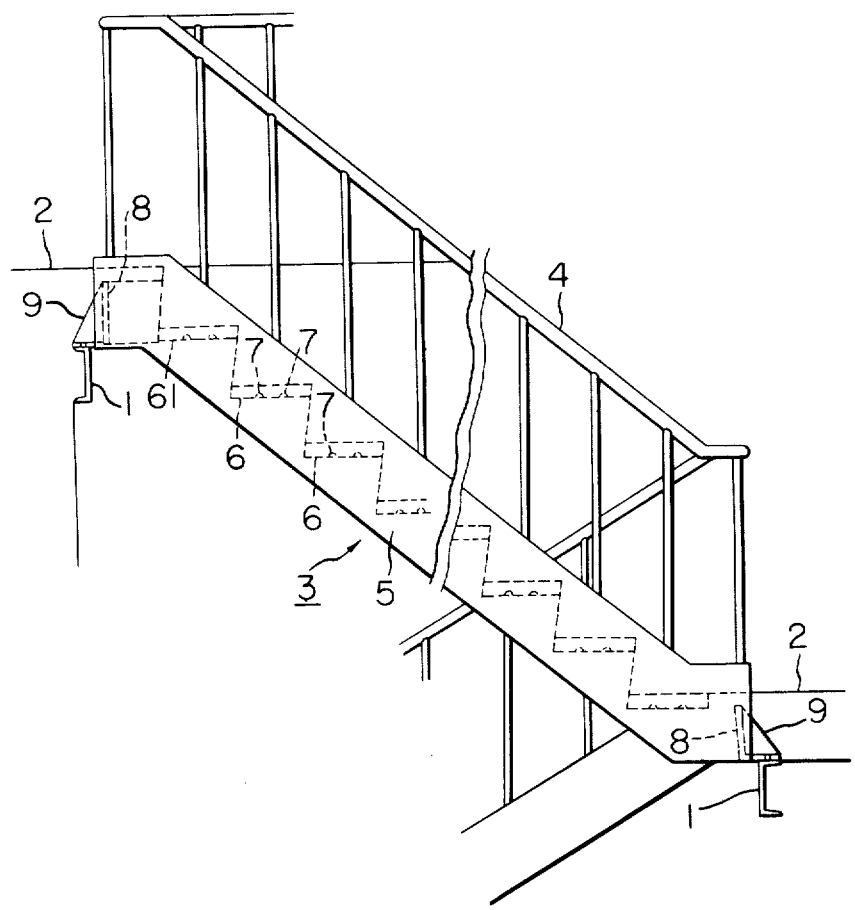
FIG. 1 is a side view showing the whole view of an embodiment of a steel stair assembly according to the present invention.

Referring first to FIG. 1 illustrating a side view of a steel stair assembly of this invention which is mounted on the supporting beam secured to a building, numeral 1 designates supporting beams each consisting of a channel steel, and numeral 2 designates landings. In FIG. 1, a steel stair assembly 3 of this invention is additionally provided with a handrail 4.

The steel stair assembly 3 is comprised of a pair of stringers 5 and a large number of individual stair units 6, and the top stair unit is replaced with an individual stair unit 61 which is somewhat different from the ordinary stair units 6. Each of the stair units 6 is provided with at least one steel rod 7 which is secured to the stringers 5 to complete the stair assembly. An end plate 8 lying between and connected to the stringers 5 at each end of the stair assembly 3 may be provided with an engaging projection member 9 to extend therefrom so that the engaging projection member 9 is placed on the supporting beam 1 of the building, or alternately the ends of the stringers 5 may be extended further so that their extended ends are placed on the supporting beams 1. In the latter case, to define the extensions of the stringers 5 that form the landing of the stair assembly, cross-beam plates formed with slots which engage with the mating slots formed at the forward and base ends of the extensions may be advantageously employed.

FIG. 2 illustrates a partial enlarged sectional view of the stair assembly 3 shown in FIG. 1. As will be seen from FIG. 2, the individual stair unit 6 is composed of two sheet steels bonded together. An upper sheet 6a and a lower sheet 6b jointly provide a tread portion 6c and a riser portion 6d. The end of the leg portion or the tread portion 6c of the stair unit 6 is formed with a downward bent portion 6e provided by the lower sheet 6b. Formed at the head portion of the L-shaped stair unit 6 or the upper end of the riser portion 6d is an opening or receiving portion 6f which is provided by the upper and lower sheets 6a and 6b to receive the downward bent portion of the upper individual stair unit. One of the sheets defining the receiving portion 6f, i.e., the upper sheet 6a is extended to form an upward bent portion 6h which is placed on the leg end of the upper stair unit, i.e., a rising portion 6g of a upwardly bent upper sheet 6a of the upper stair unit 6 in the illustrated embodiment. In the embodiment shown in FIG. 2, since the tread portion 6c is filled with mortar or resin, the two steel rods 7 are postioned in two channels 6i formed in the upper sheet 6a.

The steel stair assembly shown in FIGS. 1 and 2 is fabricated practically in the following manner. In other words, an upper sheet 6a preliminarily bent into L-shape and provided with channels 6i is prepared, and it is then formed with a rising portion 6g and an upward bent portion 6h at the ends thereof. On the other hand, a lower sheet 6b preliminarily bent into L-shape and provided with a Z-shaped bent portion for forming a receiving portion 6f and a downward bent portion 6e, is prepared. The upper and lower sheets 6a and 6b thus prepared are then placed one on top of the other with steel rods 7 held therebetween, and they are spot welded into an integral unit.

One end of each of the steel rods 7 extended through the sides of this one-piece individual stair unit 6 is inserted into a hole 5a formed in one stringer 5, and it is locked and secured to the stringer 5 by a nut, for example. Thereafter, the lower individual stair unit 6 is similarly fastened to the stringer 5 so that its receiving portion 6f receives the downward bent portion 6e of the first individual stair unit 6 previously secured to the stringer 5 and the upward bent portion 6h of the lower stair unit 6 is placed over the rising portion 6g of the previously secured stair unit. After the remaining individual stair units 6 have been successively secured to the one stringer 5 in this manner, the other stringer 5 is fitted so that all of its holes 5a receive the other ends of the steel rods 7 of all the individual stair units 6 and they are also held together by means of nuts.

The stair assembly 3 fabricated in the manner described above is mounted between stair assembly supporting beams 1 as shown in FIG. 1, and the height of the stair-treads is adjusted by means of bolts 10 on the engaging projections 9 (FIG. 2) and the treads are filled with mortar or resin 11 after which non-slips 12 are attached to the treads with adhesive to complete the mounting of the stair assembly.

Referring now to FIG. 3 which is similar to FIG. 2, there is illustrated another embodiment of the present invention, that is, there is illustrated a longitudinal side sectional view showing substantially the central portion of a steel stair assembly 3' according to the second embodiment.

The stair assembly 3' also comprises a plurality of individual stair units 6' each of which is composed of sheet steels 6'a and 6'b bonded together. Stringers 5' are identical with those used in the embodiments of FIG. 1.

The upper sheet 6'a is prepared by bending a sheet steel into L-shape and then horizontally bending the head portion of the L-shape to form an upward bent portion 6'h. The lower sheet 6'b is prepared by similarly bending a sheet steel practically into L-shape, forming two upward channels 6'i, bending the head of the L-shape into Z-shape to form a receiving portion 6'f along with the upper sheet 6'a to receive a downward bent portion 6'e of the upper individual stair unit and further providing at the end of the leg portion of the L-shape a downward bent portion 6'e to be received by the similar receiving portion 6'f of the lower stair unit and a Z-shaped depressed portion 6'k for receiving an upward bent portion 6'k of the lower stair unit.

The two sheet steels 6'a and 6'b are, along with rods 7' fitted in the channels 6'i, put together by spot welding to form an integral unit. The individual stair units thus prepared are assembled and installed in a building as shown in FIG. 3 and as previously described in connection with FIGS. 1 and 2. As usual, each of tread portion 6'c is covered with a vinyl tile 11', and it is also provided with a non-slip 12' thus completing the installation of the stair assembly.

In FIG. 4 which similar to FIG. 3, there is illustrated still another embodiment of the present invention comprising a mortared steel stair assembly in which the interconnection of the individual stair units is simplified and the use of non-slips is eliminated.

In the steel stair assembly according to the third embodiment, similarly with the previously described embodiments of the invention, each of individual stair units 6'' is composed of two sheets 6''a and 6''b which are bonded together. The stair unit 6'' is also bent into L-shape and is provided with a tread portion 6''c and a riser portion 6''d. The upper sheet 6''a is provided with channels 6''i, and the stair unit 6'' is also formed with a receiving portion 6'''f and an upward bent portion 6''h at the head portion of the L-shape and with a downward bent portion 6''e at the leg end of the L-shape. Numeral 11'' designates mortar or resin.

Figure 5:
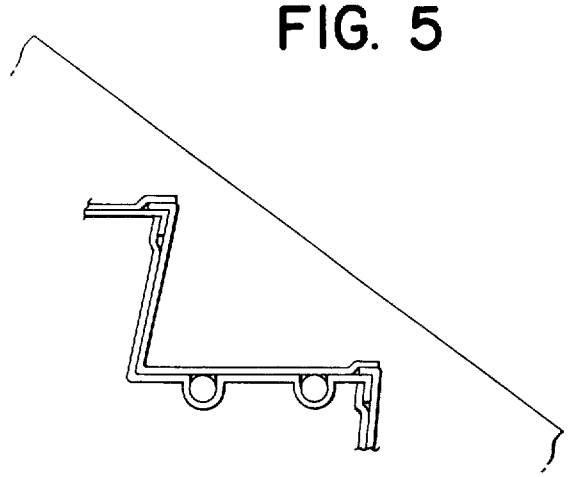
FIGS. 5 and 6 are views similar to FIG. 3 showing modified forms of the embodiment shown in FIG. 3.
Figure 6:
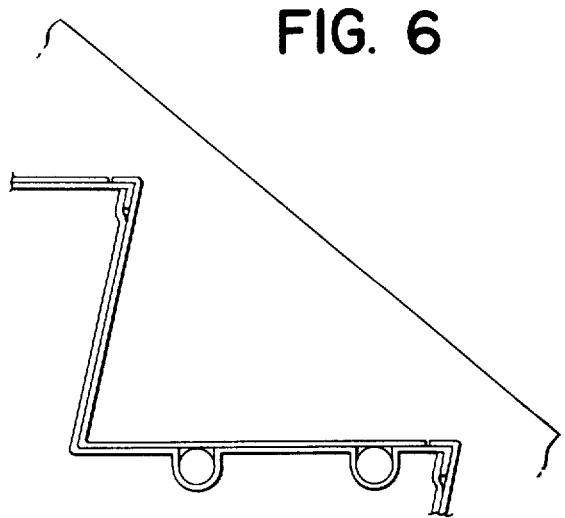

FIGS. 5 and 6 show modified forms of the embodiment shown in FIG. 3, in which a non-slip is attached with adhesive to the front end of each tread as is the customary in the art, and the remaining portion of the tread surface is covered with a vinyl tile or filled with resin material.

It will thus be seen from the foregoing that the steel stair assembly of this invention provides, by virtue of the fact that the individual stair units are secured to the stringer by means of the steel rods thus avoiding the distortion or deformation of the stringers due to welding, an improved structure which is characterized by a high degree of dimensional accuracy, reduction in the thickness of the treads and risers attained by the fact that the load acting on the stairs is borne by the steel rods which are highly resistant to tension, and a high degree of flexibility on the whole.

While, in the embodiments of the invention described so far, the receiving portion of each stair unit consists of an opening defined by the upper and lower sheets, if desired, the receiving portion may be provided by cutting into the bonded sheets to depress a portion of the riser between the cuts to define the required receiving portion between the depressed portion and the unbent portion. It is also possible to increase the thickness of the upper sheet over the lower sheet so that they are provided with different vibration coefficients against impact to reduce such abnormal reverberation as inherent to steel stairs.

What is claimed is:

1. A steel stair assembly comprising, a pair of plate type stringers arranged opposite to each other, and a plurality of L-shaped unitary individual stair units connected with each other and arranged between said stringers, each of said plurality of L-shaped individual stair units composed of at least two sheet steels bonded together and consisting of a tread portion and a riser portion in continuous form, wherein each of said plurality of stair units includes at least one steel rod close fit and positioned in at least one channel provide on the upper sheet or lower sheet or both of said bonded sheet steels substantially in the central portion of said tread portion, and wherein each of said L-shaped individual stair units further includes a downward bent portion provided at one end of the leg portion thereof, a receiving portion provided at the head portion thereof to receive the downward bent portion of the upper one of said plurality of stair units, and an upward bent portion extended from said receiving portion to cover from above one end of the leg portion of said upper stair unit.

2. A steel stair assembly according to claim 1, wherein said downward portion at one end of the leg portion of each said individual stair unit consists of only the lower sheet of said two sheet steels, and wherein said upward bent portion consists of only the upper sheet of said two sheet steels formed to cover a rising portion of the upper sheet of said upper stair unit at the end of the leg portion thereof.

3. A steel stair assembly according to claim 1, wherein said downward bent portion at one of the leg portion of each said individual stair unit consists of only the lower sheet of said two sheet steels, and wherein said upward bent portion consists of only the upper sheet of said two sheet steels formed to cover a upwardly protruding step portion of the upper sheet of said upper stair unit at the end of the leg portion thereof.

4. A steel stair assembly according to claim 1, wherein said downard bent portion at one end of the leg portion of each said individual stair unit consists of only the lower sheet of said two sheet steels, and wherein said upward bent portion consists of only the upper sheet of said two sheet steels formed to cover only the lower sheet of said upper stair unit.

5. A steel stair assembly according to claim 1, wherein said receiving portion of each said stair unit consists of an opening defined between said upper and lower sheets.

* * * * *